US012596625B2

(12) United States Patent
Mattison et al.

(10) Patent No.: US 12,596,625 B2
(45) Date of Patent: Apr. 7, 2026

(54) SYSTEMS AND METHODS FOR DATA INTEGRATION AND PREDICTIVE ANALYTICS USING TOKENIZED ARTIFICIAL INTELLIGENCE AGENTS

(71) Applicant: BANK OF AMERICA CORPORATION, Charlotte, NC (US)

(72) Inventors: Paul Mattison, Sherrills Ford, NC (US); Matthew Williams, Frisco, TX (US); Jennifer A. Raley, Mount Holly, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/766,190

(22) Filed: Jul. 8, 2024

(65) Prior Publication Data

US 2026/0010453 A1 Jan. 8, 2026

(51) Int. Cl.
*G06F 11/30* (2006.01)
*G06F 21/62* (2013.01)
*G06V 30/148* (2022.01)

(52) U.S. Cl.
CPC ...... *G06F 11/3075* (2013.01); *G06F 21/6218* (2013.01); *G06V 30/153* (2022.01)

(58) Field of Classification Search
CPC ... G06F 11/30; G06F 11/3075; G06F 21/6218
See application file for complete search history.

(56) References Cited

U.S. PATENT DOCUMENTS

| | | | |
|---|---|---|---|
| 6,128,376 A | 10/2000 | Smith | |
| 6,152,365 A | 11/2000 | Kolls | |
| 6,305,602 B1 | 10/2001 | Grabowski | |
| 6,308,887 B1 | 10/2001 | Korman | |
| 6,318,536 B1 | 11/2001 | Korman | |
| 6,473,788 B1 | 10/2002 | Kim | |
| 6,505,177 B1 | 1/2003 | Drummond | |
| 6,578,005 B1 | 6/2003 | Lesaint | |
| 7,545,816 B1 | 6/2009 | Coutts | |
| 11,334,057 B2 * | 5/2022 | Gattu ................. | G05B 23/0281 |

(Continued)

*Primary Examiner* — Kamini B Patel
(74) *Attorney, Agent, or Firm* — Moore & Van Allen PLLC; Nicholas C. Russell

(57) ABSTRACT

Systems, computer program products, and methods are described herein for data integration and predictive analytics using tokenized artificial intelligence agents. The present disclosure is configured to extract invoicing data from an invoicing database, service ticket data from a service ticket system, and contract data from a contract warehouse using a tokenized API interface; normalize and integrate the extracted data within a data rationalization warehouse; process the integrated data using a proprietary tokenized AI agent to identify patterns and trends; apply a machine learning model to the processed data to generate predictive maintenance recommendations; present the predictive maintenance recommendations and underlying data to end users through a presentation layer; and allow end users to interact with and adjust the predictive maintenance recommendations, with changes tracked and updated in the system. This innovative approach enhances data security, accuracy, and the efficiency of maintenance operations through advanced AI-driven analytics.

18 Claims, 5 Drawing Sheets

(56) References Cited

U.S. PATENT DOCUMENTS

| 12,177,185 | B1 * | 12/2024 | Ryland | ................. | H04L 63/102 |
| 2003/0069797 | A1 | 4/2003 | Harrison | | |
| 2005/0094772 | A1 | 5/2005 | Harrison | | |
| 2013/0145222 | A1 * | 6/2013 | Birdsall | ............. | G06F 11/0787 |
| | | | | | 714/48 |
| 2022/0206485 | A1 * | 6/2022 | Qadri | ................. | G05B 23/0283 |
| 2024/0211156 | A1 * | 6/2024 | Pabón | ................. | G06F 21/6218 |
| 2025/0181740 | A1 * | 6/2025 | Hochmuth | .......... | G06F 21/6218 |

* cited by examiner

SYSTEMS AND METHODS FOR DATA INTEGRATION AND PREDICTIVE ANALYTICS USING TOKENIZED ARTIFICIAL INTELLIGENCE AGENTS

TECHNOLOGICAL FIELD

Example embodiments of the present disclosure relate to systems and methods for data integration and predictive analytics using tokenized artificial intelligence agents.

BACKGROUND

In many industries, machines generate vast amounts of data related to their operations, maintenance, and performance. This data, often in various formats and stored in disparate systems, can be challenging to integrate and analyze effectively. Traditional methods of data integration and analysis are often manual, time-consuming, and prone to errors, limiting their ability to provide timely and actionable insights. Moreover, the increasing complexity and volume of data necessitate advanced solutions that can autonomously process and analyze data from multiple sources.

Current systems lack the capability to seamlessly integrate machine data with servicing, contract, and invoicing data, particularly when much of this data is paper-based or in unstructured formats. Additionally, existing predictive analytics models often fail to account for a wide range of variables, such as geolocation-specific factors and historical weather data, which can significantly impact machine performance and maintenance needs.

Applicant has identified a number of deficiencies and problems associated with data integration and predictive analytics using tokenized artificial intelligence agents. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for data integration and predictive analytics using tokenized artificial intelligence agents. Example embodiments of the present disclosure provide a comprehensive solution for extracting, integrating, and analyzing data from various sources using tokenized AI agents. These agents are designed to extract machine data, service ticket information, and contract and invoicing data, even from paper-based or image files, using optical character recognition (OCR) technology. The integrated data is then processed by an AI model that performs advanced statistical analysis to identify historical trends, predict maintenance needs, and uncover potential root causes for machine issues.

The AI model leverages a proprietary, tokenized API interface to securely consume data from multiple systems, enabling a level of data integration and analysis that is not achievable with traditional methods. The model also incorporates external factors, such as weather and geolocation-specific data, to enhance its predictive capabilities. The processed data is presented to end users through an explainable AI platform, which allows for iterative review and adjustment based on human inputs, ensuring the accuracy and relevance of the insights provided.

The novelty of this invention lies in its ability to autonomously analyze vast amounts of data, identify patterns, and provide actionable recommendations in a user-friendly and explainable format. This not only improves the efficiency and effectiveness of data-driven decision-making but also enhances the overall maintenance and operational strategies for machine fleets.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
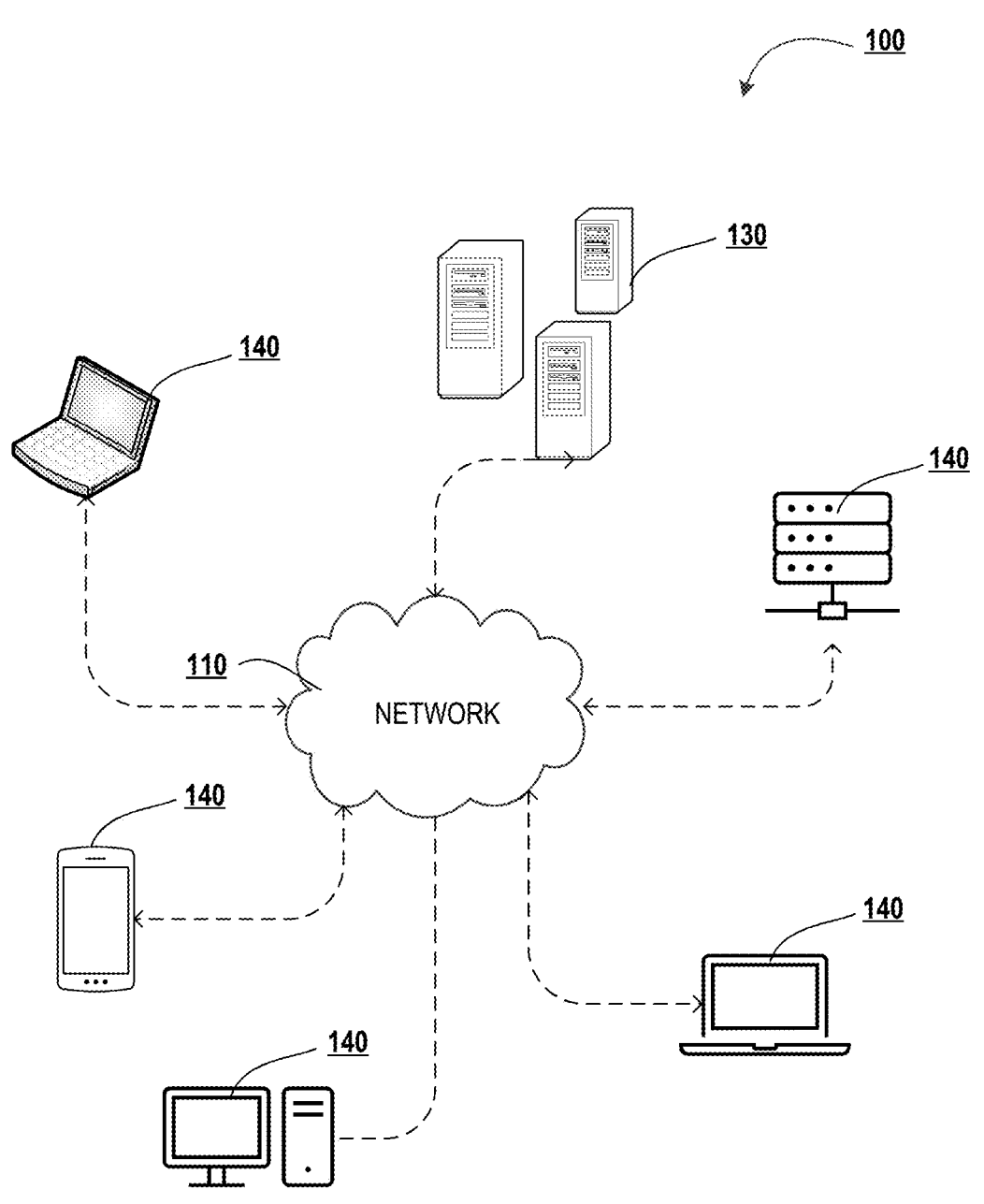
Figure 2:
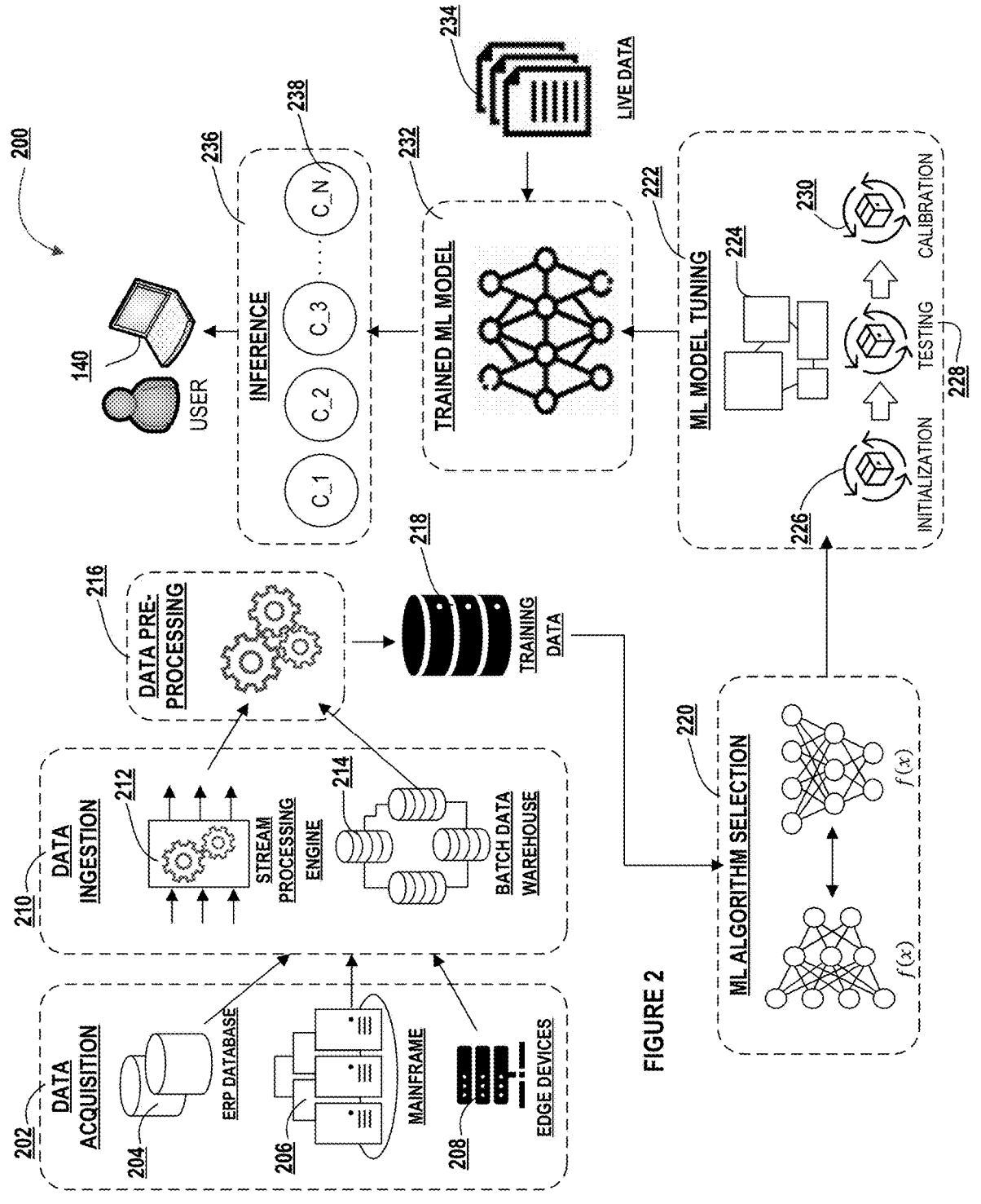
Figure 3:
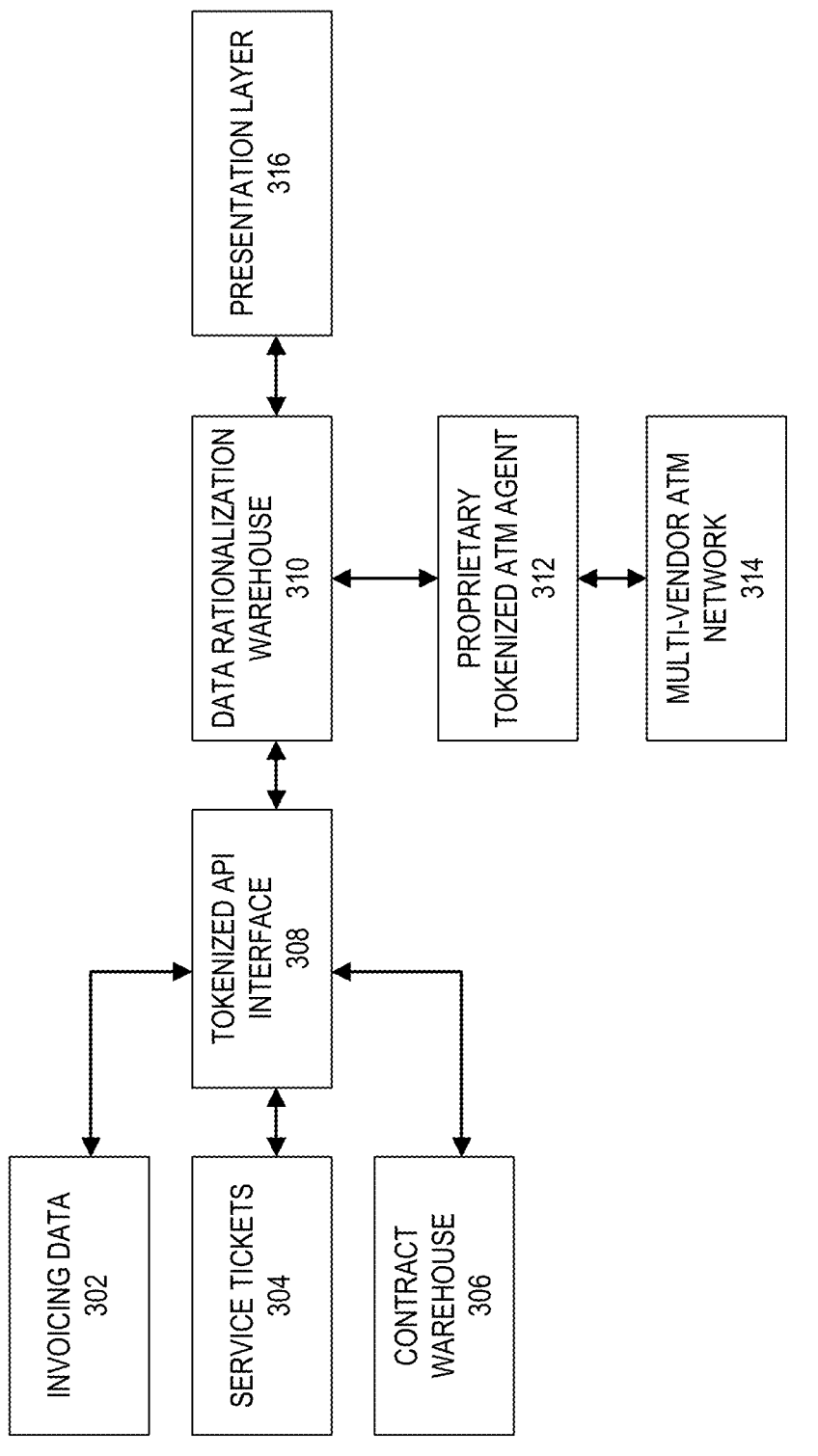

FIGS. 1A-IC illustrates technical components of an exemplary distributed computing environment for data integration and predictive analytics using tokenized artificial intelligence agents, in accordance with an embodiment of the disclosure;

FIG. 2 illustrates an exemplary machine learning (ML) subsystem architecture 200, in accordance with an embodiment of the invention; and FIG. 3 illustrates a component diagram for data integration and predictive analytics using tokenized artificial intelligence agents, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/ rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As used herein, "predefined statistical guardrails" refer to the established boundaries or limits within which adjustments to AI-generated predictions or recommendations can be made, ensuring that such adjustments remain statistically valid and do not compromise the integrity of the predictive model. These guardrails are derived from statistical analysis and historical data, setting permissible ranges for modifications based on standard deviations, confidence intervals, or other relevant statistical metrics. Predefined statistical guardrails are implemented to maintain the reliability and accuracy of the AI model's outputs while allowing for human expertise and intervention. For example, in a predictive maintenance system, guardrails may specify the acceptable range for altering maintenance schedules or thresholds for triggering alerts based on historical performance data. The system uses these guardrails to automatically check any user-modified parameters, ensuring that they fall within the statistically acceptable range. These guardrails can be configured using various statistical methods, such as: (1) Standard Deviation: Defining limits based on the standard deviation from the mean of historical data; (2) Confidence Intervals: Setting boundaries within which the true value of a parameter is expected to lie with a certain probability (e.g., 95% confidence interval); and (3) Percentiles: Establishing limits based on percentile ranks of historical data distributions (e.g., adjustments allowed within the 10th to 90th percentile range). In implementing predefined statistical guardrails, the system ensures that user adjustments do not lead to erroneous or implausible outcomes, thereby preserving the robustness and accuracy of the predictive analytics model.

As used herein, "data integration" refers to the process of combining data from multiple sources to provide a unified and consistent view of the data. This process involves extracting data from diverse sources such as invoicing systems, service ticket repositories, and contract warehouses. The extracted data is then transformed to ensure consistency and loaded into a centralized data repository. Data integration is critical for ensuring that data from different formats and systems can be used together effectively. Techniques involved in data integration include ETL (Extract, Transform, Load) processes, data cleaning, and normalization. The goal is to create a comprehensive dataset that supports accurate and meaningful analysis.

As used herein, "predictive analytics" refers to the application of statistical algorithms, machine learning techniques, and data mining to analyze historical data and make informed predictions about future events. In the context of the present disclosure, predictive analytics involves analyzing historical maintenance data, service records, and external factors such as weather and geolocation-specific attributes to predict potential machine failures and optimize maintenance schedules. Predictive models are built using programming languages such as Python or R, and libraries such as TensorFlow, PyTorch, or scikit-learn. These models use various techniques including regression analysis, time series forecasting, and neural networks to identify patterns and predict future outcomes.

As used herein, "tokenized artificial intelligence (AI) agent" refers to a specialized AI-powered software entity that uses tokenization techniques to handle and process data securely. These agents autonomously extract data from multiple sources, including machine data, service tickets, and contracts, and transform it into a standardized format for analysis. The tokenization process replaces sensitive information with unique tokens that retain the data's essential characteristics without exposing sensitive details. The AI agents are implemented using programming languages such as Python or Java and are designed to work with machine learning frameworks like TensorFlow or PyTorch. They operate in a distributed computing environment to handle large volumes of data efficiently and securely.

As used herein, "Application Programming Interface (API)" refers to a set of defined protocols and tools that allow different software applications to communicate with each other. In the context of this disclosure, APIs facilitate the secure exchange of data between the invoicing data systems, service ticket systems, contract warehouses, and the centralized data rationalization warehouse. These APIs are designed to handle requests and responses using secure communication protocols like HTTPS and are implemented using frameworks such as Flask or Django for Python, or Express for Node.js. Tokenization and encryption techniques are employed to ensure that sensitive data is protected during transmission.

As used herein, "data rationalization" refers to the process of organizing, standardizing, and cleaning data to ensure its consistency and usability for analysis. This involves transforming raw data from various sources into a structured format that can be easily processed by machine learning algorithms. Data rationalization includes removing duplicates, correcting errors, normalizing values, and integrating data from different formats and sources. The process is critical for creating a reliable dataset that supports accurate predictive analytics. Tools and technologies used in data rationalization include Apache Spark for large-scale data processing, ETL tools like Talend, and data cleaning libraries in Python such as pandas.

As used herein, "explainable AI" refers to artificial intelligence systems that provide transparent and understandable explanations for their decisions and predictions. This aspect of AI is crucial for ensuring that users can trust and effectively use the insights generated by the AI models. Explainable AI techniques involve creating models that are interpretable by design or using post-hoc methods to explain complex model outputs. For instance, decision trees and linear models are inherently interpretable, while methods like LIME (Local Interpretable Model-agnostic Explanations) and SHAP (SHapley Additive explanations) are used to explain the predictions of more complex models such as neural networks. The presentation layer of the system utilizes these techniques to display the rationale behind AI predictions, allowing users to interact with and adjust the model outputs based on their expertise and feedback.

As used herein, "neural network" refers to a series of algorithms designed to recognize patterns and relationships in data. Neural networks consist of layers of interconnected nodes, or neurons, that process data and learn from it. In the context of this disclosure, neural networks are employed to analyze historical maintenance data and predict future maintenance needs. They are particularly effective at handling large and complex datasets, identifying non-linear relationships, and making accurate predictions. These networks are implemented using machine learning frameworks such as TensorFlow or PyTorch, and are trained on large datasets to optimize their predictive capabilities. The training process involves adjusting the weights of the connections between neurons based on the error of the predictions, using techniques like backpropagation and gradient descent.

The present disclosure introduces a system and method for data integration and predictive analytics using tokenized artificial intelligence (AI) agents. These tokenized AI agents are designed to autonomously extract, integrate, and analyze data from various sources, providing actionable insights and predictions. In the field of machine maintenance and operations, there are significant challenges in effectively integrating and analyzing data from multiple sources. Machine data, service records, contracts, and invoices are often stored in disparate systems and formats, including paper-based documents. Traditional methods of data integration and analysis are manual, time-consuming, and error-prone, limiting their ability to provide timely and accurate insights. Moreover, existing predictive analytics models fail to account for a wide range of variables, such as geolocation-specific factors and historical weather data, which are critical for accurate predictions.

The present disclosure addresses these challenges by utilizing proprietary, tokenized AI agents that can extract data from any machine and integrate it with servicing, contract, and invoicing data. The AI model uses optical character recognition (OCR) technology to process paper-based documents and leverages a tokenized API interface for secure data integration. By analyzing historical maintenance patterns, geolocation-specific data, and additional variables such as weather, the AI model provides accurate predictions and actionable recommendations. This solution reduces the need for manual data processing, improves the accuracy of predictions, and enhances overall maintenance and operational strategies.

Accordingly, the present disclosure provides a comprehensive solution for data integration and predictive analytics using tokenized artificial intelligence agents. This system automates the extraction and integration of data from multiple sources, processes large volumes of data to identify trends and predict maintenance needs, and presents the results in an explainable format for end users. The AI model's ability to incorporate additional variables, such as weather and geolocation data, significantly enhances its predictive capabilities and provides a more holistic understanding of machine performance and maintenance requirements.

What is more, the present disclosure provides a technical solution to a technical problem. As described herein, the technical problem includes the difficulty of integrating and analyzing data from disparate sources to provide timely and accurate predictive maintenance insights. The technical solution presented herein allows for the autonomous extraction, integration, and analysis of data using tokenized AI agents, thereby addressing the limitations of traditional methods. In particular, this solution is an improvement over existing solutions to the data integration and predictive analytics problem, (i) with fewer steps to achieve the solution, thus reducing the amount of computing resources, such as processing resources, storage resources, network resources, and/or the like, that are being used, (ii) providing a more accurate solution to the problem, thus reducing the number of resources required to remedy any errors made due to a less accurate solution, (iii) removing manual input and waste from the implementation of the solution, thus improving the speed and efficiency of the process and conserving computing resources, and (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1B:
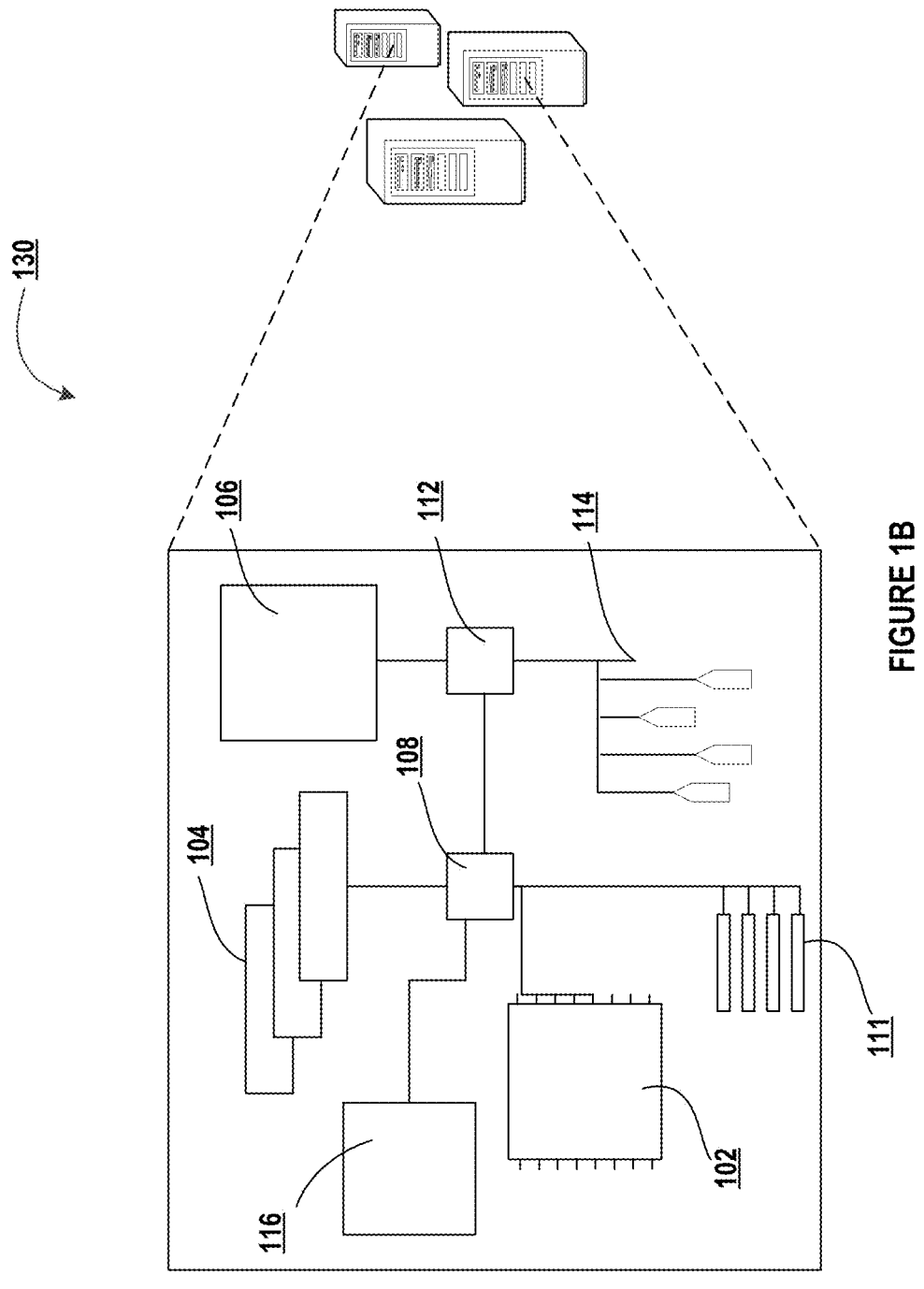
Figure 1C:
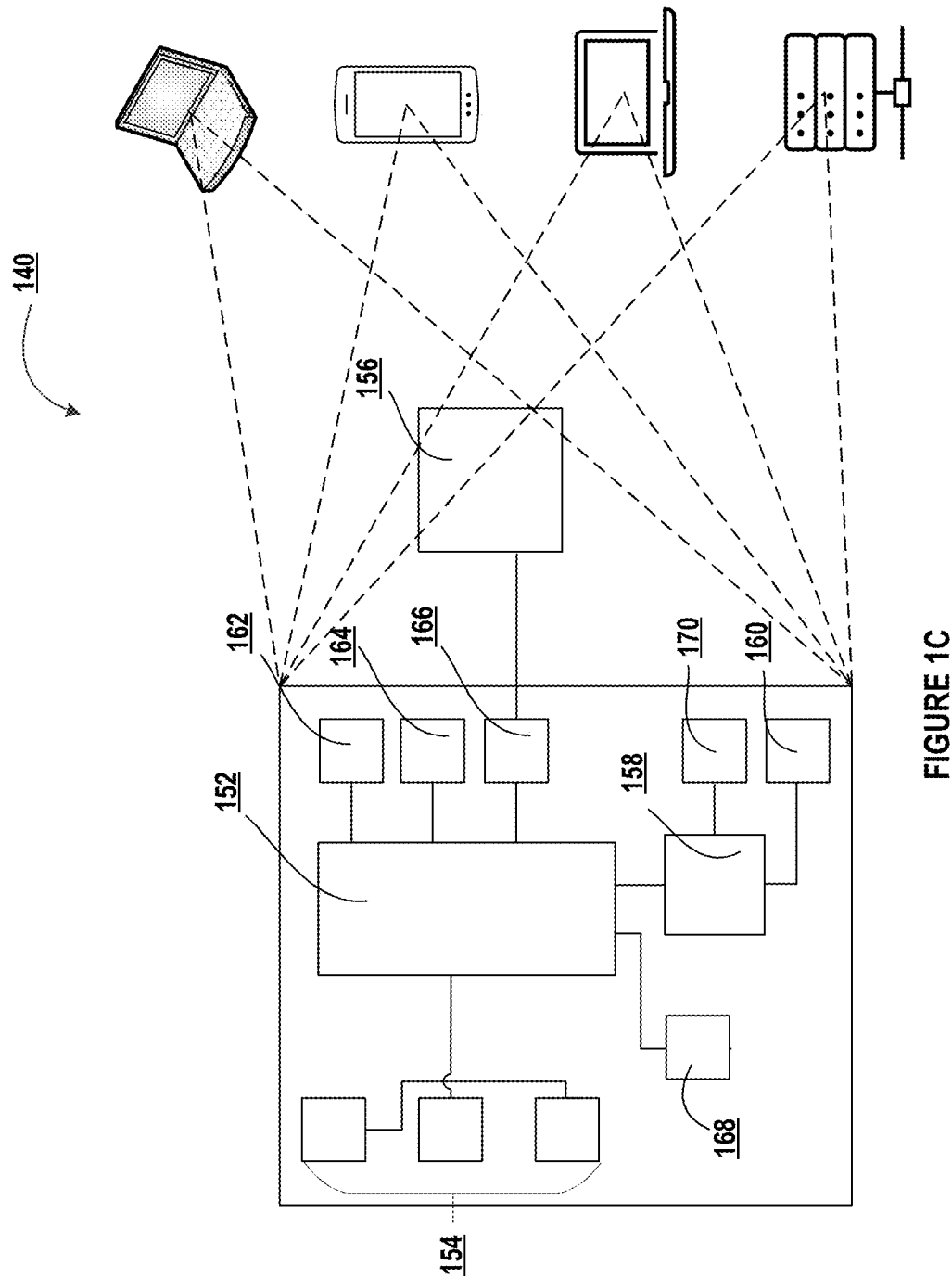

FIGS. 1A-1C illustrate technical components of an exemplary distributed computing environment 100 for data integration and predictive analytics using tokenized artificial intelligence agents, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a backpropagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a component diagram for data integration and predictive analytics using tokenized artificial intelligence agents, in accordance with an embodiment of the disclosure. The system begins with the collection of data from multiple sources, including invoicing data 302, service tickets 304, and contract data stored in a contract warehouse 306. Invoicing data typically resides in a relational database management system such as MySQL or PostgreSQL, or in a NoSQL database like MongoDB, containing structured data such as invoice numbers, dates, amounts, vendor details, and payment statuses. Service tickets are stored in repositories that manage records of maintenance requests, issue reports, resolution steps, and technician details, often using software like Jira or ServiceNow, or custom-built systems using frameworks such as Django or Ruby on Rails. The contract warehouse stores contract-related data, including signed contracts, addendums, amendments, and associated metadata. This data is often in digital formats (PDF, DOCX), and OCR technology, such as Tesseract, is employed to convert scanned paper documents into machine-readable text.

To address the challenge of integrating these varied data sources, the system employs a tokenized API interface 308. This interface securely facilitates the extraction and transmission of data from the invoicing data, service tickets, and contract warehouse to a centralized data rationalization warehouse 310. The API interface is designed using secure communication protocols like HTTPS and utilizes tokenization to protect sensitive data. Tokenization replaces sensitive data elements with non-sensitive equivalents, ensuring data integrity and confidentiality. This API could be implemented using RESTful web services in programming languages such as Python (using Flask or Django REST framework) or Node.js (using Express).

Once the data is centralized in the data rationalization warehouse 310, a proprietary tokenized AI agent 312 processes and rationalizes the data. This agent standardizes and organizes the data, making it ready for further analysis. It employs algorithms coded in languages such as Python or Java, leveraging machine learning libraries like TensorFlow or PyTorch. The agent's tokenization capability allows it to handle data from various vendors and sources, ensuring compatibility and consistency. The processed data is then fed into a multi-vendor AI network 314, which aggregates data from multiple vendors and sources to provide a comprehensive view of the machine fleet's maintenance needs. This network ensures interoperability and data exchange between different systems, implemented using middleware solutions like Apache Kafka for real-time data streaming and integration.

The integrated data is analyzed using advanced AI models that consider various factors, including historical maintenance data, weather conditions, and geolocation-specific attributes. These AI models, built using frameworks such as TensorFlow or PyTorch, predict potential maintenance issues and provide actionable recommendations, helping to prevent machine failures and optimize maintenance schedules. The results of the AI analysis are presented to end users through a presentation layer 316, which is part of an explainable AI platform. This layer is designed to provide transparency and user interaction with the AI-generated insights. It is built using web technologies such as React.js or Angular for the front end, and charting libraries like D3.js or Chart.js for data visualization. The presentation layer ensures that users can view, understand, and interact with the data, including the ability to edit and adjust results within defined statistical guardrails.

In one embodiment, the APIs within the tokenized API interface 308 are programmed to handle data requests and responses securely. For example, a Python-based Flask API can use JWT (JSON Web Tokens) for authentication and tokenization. When a request is made to extract invoicing data, the API validates the token, fetches the required data from the invoicing database 302, tokenizes sensitive information, and transmits it to the data rationalization warehouse 310 over an encrypted channel. Another embodiment involves the OCR processing within the contract warehouse 306. A Tesseract-based OCR system integrated with a Python script scans uploaded contract documents, extracts text, and stores it in a structured format in a database. This data is then accessible via the tokenized API interface 308 for further integration and analysis.

The data rationalization process in the warehouse 310 may involve using Apache Spark for large-scale data processing and normalization. Spark jobs written in Scala or Python can clean, transform, and load data into a consistent schema, preparing it for analysis by the proprietary tokenized AI agent 312. The AI models utilized by the AI agent 312 are trained on historical data using machine learning techniques. For instance, a neural network model implemented in TensorFlow can be trained to predict maintenance needs based on features such as machine usage patterns, weather conditions, and geolocation-specific data. The trained model analyzes incoming data in real-time and generates predictions.

The presentation layer 316 ensures that these predictions are displayed in an accessible and understandable format. For example, a React.js application provides a dashboard where users can view maintenance predictions, historical trends, and the underlying data used for these predictions. Users can interact with the data, make adjustments, and provide feedback, which is then fed back into the AI models for continuous improvement.

In summary, the system illustrated in FIG. 3 provides a robust solution for data integration and predictive analytics using tokenized artificial intelligence agents. By securely integrating data from various sources, processing it through a centralized warehouse, and analyzing it with advanced AI models, the system delivers accurate and actionable insights. The explainable AI platform ensures transparency and user engagement, allowing for continuous improvement and optimization of maintenance strategies.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for data integration and predictive analytics using tokenized artificial intelligence agents, the system comprising:
   a processing device;
   a non-transitory storage device containing instructions when executed by the processing device, causes the processing device to perform the steps of:
   extracting data comprising invoicing data from a plurality of sources comprising an invoicing database, service ticket data from a service ticket system, and contract data from a contract warehouse using a tokenized API interface, wherein the extracted data from the plurality of sources is in varying formats;
   normalizing and integrating the extracted data in the varying formats within a data rationalization warehouse generating integrated data;
   processing the integrated data generating processed data, using a proprietary tokenized AI agent to identify one or more patterns and trends;
   applying a machine learning model to the processed data to generate a predictive maintenance recommendation, wherein the machine learning model incorporates external factors comprising historical weather data and geolocation-specific attributes to enhance prediction accuracy of the predictive maintenance recommendation;
   presenting the predictive maintenance recommendation and underlying data to end users through a presentation layer; and
   allowing the end users to interact with and adjust the predictive maintenance recommendation, with changes tracked and updated in the system.

2. The system of claim 1, wherein the system is further configured to: utilize optical character recognition (OCR) technology to extract contract data from paper-based documents stored in the contract warehouse.

3. The system of claim 1, wherein the tokenized API interface is further configured to:
   secure data transfer between the invoicing database, service ticket system, and contract warehouse using encryption and tokenization techniques.

4. The system of claim 1, wherein the data rationalization warehouse is further configured to: employ data cleaning and normalization techniques to ensure consistency and accuracy of the integrated data.

5. The system of claim 1, wherein the proprietary tokenized AI agent is further configured to: analyze the integrated data using machine learning models implemented in TensorFlow or PyTorch.

6. The system of claim 1, wherein the presentation layer is further configured to:
   utilize explainable AI techniques to provide transparency and understanding of AI-generated recommendations, allowing the end users to view and edit results within one or more predefined statistical guardrails.

7. A computer program product for data integration and predictive analytics using tokenized artificial intelligence agents, the computer program product comprising a non-transitory computer-readable medium comprising code causing an apparatus to perform the following:
   extracting data comprising invoicing data from a plurality of sources comprising an invoicing database, service ticket data from a service ticket system, and contract data from a contract warehouse using a tokenized API interface, wherein the extracted data from the plurality of sources is in varying formats;

normalizing and integrating the extracted data in the varying formats within a data rationalization warehouse generating integrated data;

processing the integrated data generating processed data, using a proprietary tokenized AI agent to identify one or more patterns and trends;

applying a machine learning model to the processed data to generate a predictive maintenance recommendation, wherein the machine learning model incorporates external factors comprising historical weather data and geolocation-specific attributes to enhance prediction accuracy of the predictive maintenance recommendation;

presenting the predictive maintenance recommendation and underlying data to end users through a presentation layer; and allowing the end users to interact with and adjust the predictive maintenance recommendation, with changes tracked and updated in the system.

8. The computer program product of claim 7, wherein the code further causes the apparatus to: utilize optical character recognition (OCR) technology to extract contract data from paper-based documents stored in the contract warehouse.

9. The computer program product of claim 7, wherein the tokenized API interface is further configured to: secure data transfer between the invoicing database, service ticket system, and contract warehouse using encryption and tokenization techniques.

10. The computer program product of claim 7, wherein the data rationalization warehouse is further configured to: employ data cleaning and normalization techniques to ensure consistency and accuracy of the integrated data.

11. The computer program product of claim 7, wherein the proprietary tokenized AI agent is further configured to: analyze the integrated data using machine learning models implemented in TensorFlow or PyTorch.

12. The computer program product of claim 7, wherein the presentation layer is further configured to: utilize explainable AI techniques to provide transparency and understanding of AI-generated recommendations, allowing the end users to view and edit results within one or more predefined statistical guardrails.

13. A method for data integration and predictive analytics using tokenized artificial intelligence agents, the method comprising:

extracting data comprising invoicing data from a plurality of sources comprising an invoicing database, service ticket data from a service ticket system, and contract data from a contract warehouse using a tokenized API interface, wherein the extracted data from the plurality of sources is in varying formats;

normalizing and integrating the extracted data in the varying formats within a data rationalization warehouse generating integrated data;

processing the integrated data generating processed data, using a proprietary tokenized AI agent to identify one or more patterns and trends;

applying a machine learning model to the processed data to generate a predictive maintenance recommendation, wherein the machine learning model incorporates external factors comprising historical weather data and geolocation-specific attributes to enhance prediction accuracy of the predictive maintenance recommendation;

presenting the predictive maintenance recommendation and underlying data to end users through a presentation layer; and allowing the end users to interact with and adjust the predictive maintenance recommendation, with changes tracked and updated in the system.

14. The method of claim 13, wherein the method further comprises: utilize optical character recognition (OCR) technology to extract contract data from paper-based documents stored in the contract warehouse.

15. The method of claim 13, wherein the tokenized API interface is further configured to:

secure data transfer between the invoicing database, service ticket system, and contract warehouse using encryption and tokenization techniques.

16. The method of claim 13, wherein the data rationalization warehouse is further configured to: employ data cleaning and normalization techniques to ensure consistency and accuracy of the integrated data.

17. The method of claim 13, wherein the proprietary tokenized AI agent is further configured to: analyze the integrated data using machine learning models implemented in TensorFlow or PyTorch.

18. The method of claim 13, wherein the presentation layer is further configured to:

utilize explainable AI techniques to provide transparency and understanding of the AI-generated recommendations, allowing the end users to view and edit the results within one or more predefined statistical guardrails.

* * * * *